US012305340B2

(12) United States Patent
Sakurada et al.

(10) Patent No.: US 12,305,340 B2
(45) Date of Patent: May 20, 2025

(54) CONTROL DEVICE, CONTROL SYSTEM, CONTROL METHOD, AND ROAD SURFACE DRIVE DEVICE

(71) Applicant: TOYOTA JIDOSHA KABUSHIKI KAISHA, Toyota (JP)

(72) Inventors: Shin Sakurada, Toyota (JP); Kazuya Nishimura, Anjo (JP); Yuko Mizuno, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 655 days.

(21) Appl. No.: 17/659,942

(22) Filed: Apr. 20, 2022

(65) Prior Publication Data

US 2023/0011883 A1 Jan. 12, 2023

(30) Foreign Application Priority Data

Jul. 8, 2021 (JP) ................................ 2021-113861

(51) Int. Cl.
*E01C 11/22* (2006.01)
*E01C 11/00* (2006.01)
*E01C 15/00* (2006.01)
*G08G 1/017* (2006.01)

(52) U.S. Cl.
CPC .............. *E01C 15/00* (2013.01); *E01C 11/00* (2013.01); *G08G 1/017* (2013.01)

(58) Field of Classification Search
CPC . E01C 9/00; E01C 9/04; E01C 11/222; E01C 15/00
USPC .......................................................... 414/921
See application file for complete search history.

(56) References Cited

U.S. PATENT DOCUMENTS

| | | | | |
|---|---|---|---|---|
| 4,559,659 A * | 12/1985 | Hunter, Jr. | ............ | E01C 11/222 14/71.3 |
| 8,813,290 B1 * | 8/2014 | Morris | .................. | B66B 9/0869 14/71.3 |
| 9,045,908 B1 * | 6/2015 | Morris | .................. | E04F 11/002 |
| 9,587,404 B1 * | 3/2017 | Franco | .................. | E04F 11/002 |
| 9,920,535 B2 * | 3/2018 | Belman | ................. | E04F 11/002 |
| 10,060,135 B1 * | 8/2018 | Morris | .................. | E04F 11/002 |
| 10,403,129 B1 * | 9/2019 | Suarez | ...................... | G08B 6/00 |
| 10,415,254 B2 * | 9/2019 | Belman | ................. | E04F 11/002 |
| 2016/0110998 A1 * | 4/2016 | Todasco | ................. | G08G 1/005 340/944 |

FOREIGN PATENT DOCUMENTS

| | | |
|---|---|---|
| CN | 106836046 A | 6/2017 |
| CN | 212801169 U | 3/2021 |
| JP | 2014-225151 A | 12/2014 |

* cited by examiner

*Primary Examiner* — Gary S Hartmann
(74) *Attorney, Agent, or Firm* — Dickinson Wright, PLLC

(57) ABSTRACT

A control device outputs control information to a sidewalk configured such that an inclination of a road surface is changeable. When the control device detects a wheelchair waiting on the sidewalk for crossing a road, the control device outputs, as the control information, information of instruction to reduce the inclination of the road surface of the sidewalk.

20 Claims, 5 Drawing Sheets

CONTROL DEVICE, CONTROL SYSTEM, CONTROL METHOD, AND ROAD SURFACE DRIVE DEVICE

CROSS-REFERENCE TO RELATED APPLICATION

This application claims priority to Japanese Patent Application No. 2021-113861 filed on Jul. 8, 2021, incorporated herein by reference in its entirety.

BACKGROUND

1. Technical Field

The present disclosure relates to a control device, a control system, a control method, and a road surface drive device.

2. Description of Related Art

There is a known configuration that notifies, when a pedestrian starts crossing a place on a road, the surrounding vehicles that there is a pedestrian who is crossing the road (see, for example, Japanese Unexamined Patent Application Publication No. 2014-225151 (JP 2014-225151 A)).

SUMMARY

Depending on the condition of the point where the wheelchair starts crossing the road, it may be difficult for the wheelchair to wait until the start of crossing, or it may be difficult for the wheelchair to start crossing.

An object of the present disclosure made in view of such circumstances is to improve the convenience in traveling of the wheelchair.

A control device according to an embodiment of the present disclosure outputs control information to a sidewalk configured such that an inclination of a road surface is changeable. When the control device detects a wheelchair waiting on the sidewalk for crossing a road, the control device outputs, as the control information, information of instruction to reduce the inclination of the road surface of the sidewalk.

A control system according to an embodiment of the present disclosure includes the control device and a road surface drive device.

A control method according to an embodiment of the present disclosure includes outputting, as control information, information of instruction to reduce an inclination of a road surface of a sidewalk, to the sidewalk configured such that the inclination of the road surface is changeable, when a wheelchair waiting on the sidewalk for crossing the road is detected.

A road surface drive device according to an embodiment of the present disclosure controls an inclination of a road surface. The road surface drive device includes a base that constitutes the road surface, a drive unit that drives the base, and a control unit that controls the drive unit so as to change the inclination of the road surface based on control information that indicates a direction and a magnitude of the inclination of the road surface.

With the control device, the control system, the control method, and the road surface drive device according to the embodiment of the present disclosure, the convenience in traveling of a wheelchair can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration Example of Control System 1

Figure 1:
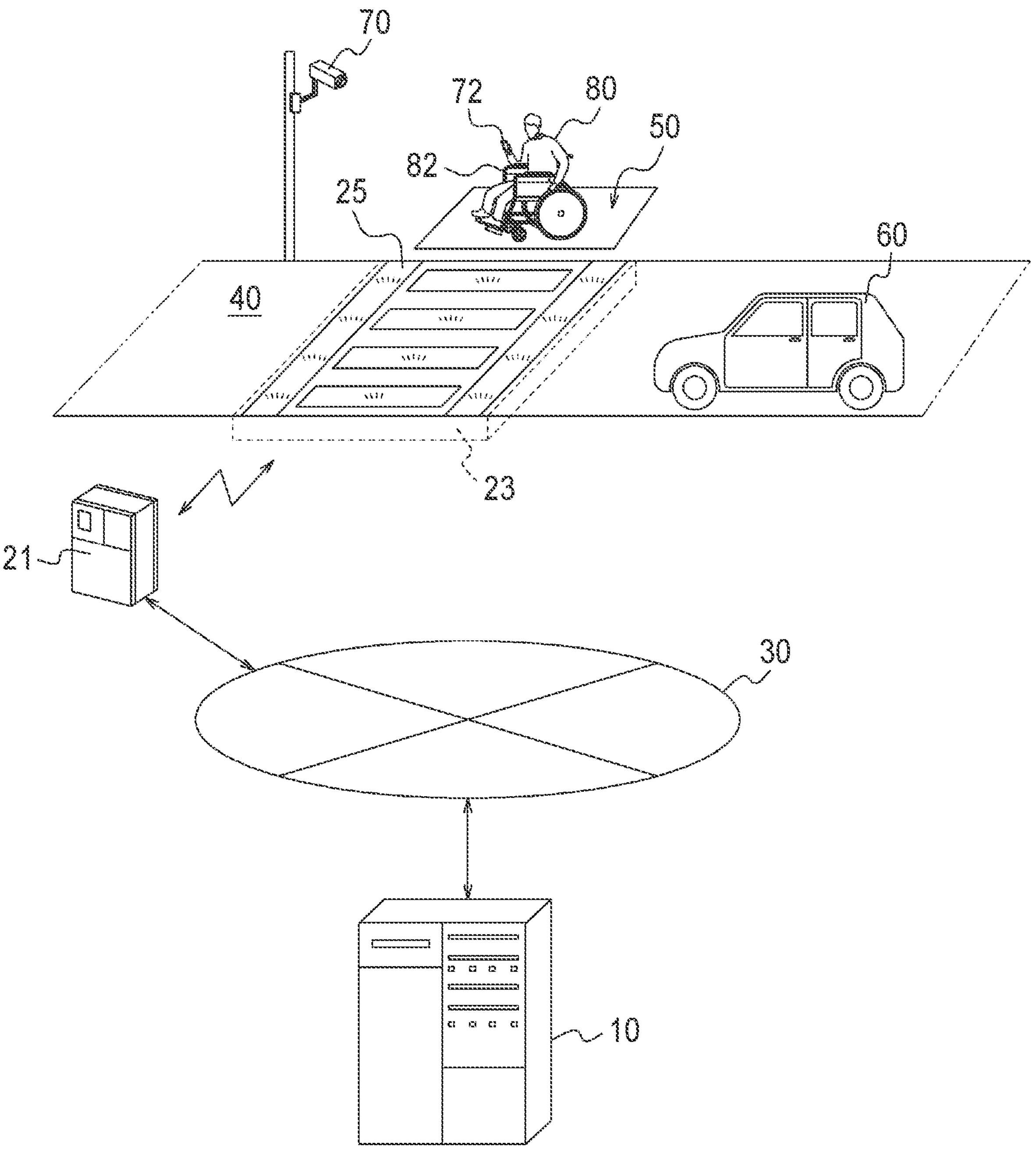
FIG. 1 is a schematic diagram showing a configuration example of a control system according to an embodiment.
Figure 2:
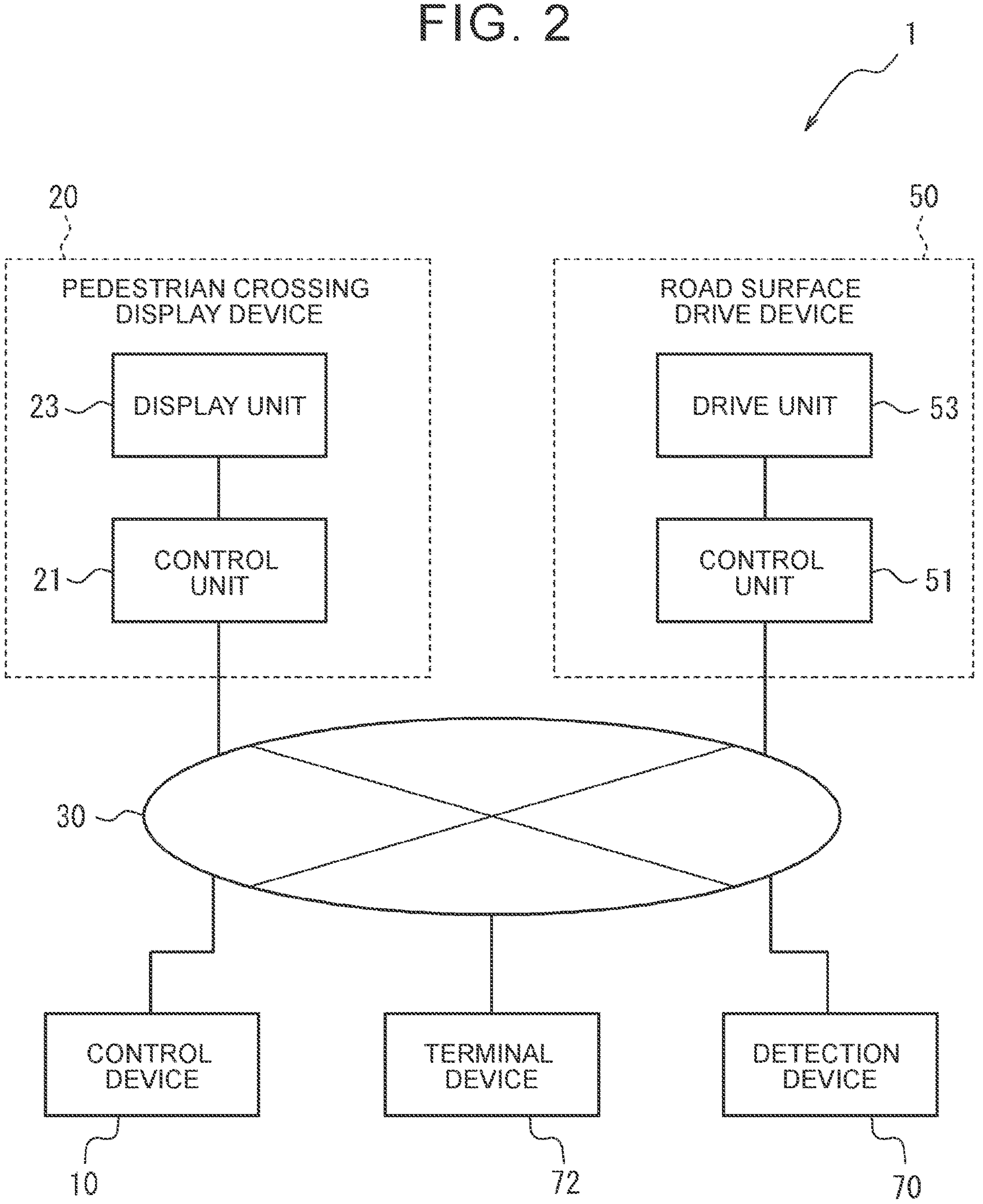
FIG. 2 is a schematic block diagram showing the configuration example of the control system according to the embodiment.

As shown in FIGS. 1 and 2, a control system 1 according to an embodiment includes a control device 10 and a road surface drive device 50. The road surface drive device 50 is installed in a sidewalk located around a road 40 and is configured to drive the road surface of the sidewalk. The control device 10 outputs information for controlling the inclination or the height of the road surface by causing the road surface drive device 50 to drive the road surface of the sidewalk. That is, the control system 1 controls the inclination or the height of the road surface of the sidewalk. Further, the sidewalk is configured such that the inclination of the road surface is changeable by installing the road surface drive device 50. When there is a wheelchair 82 that crosses the road 40, the control system 1 controls the inclination or the height of the road surface at a place where the wheelchair 82 waits before crossing the road 40.

The control system 1 further includes a pedestrian crossing display device 20 although it is not essential. The pedestrian crossing display device 20 is configured to display a pedestrian crossing 25 on the road 40 on which a vehicle 60 travels. The control device 10 may output information regarding the position or the timing at which the pedestrian crossing display device 20 displays the pedestrian crossing 25. That is, the control system 1 may control display of the pedestrian crossing 25 on the road 40. When there is the wheelchair 82 that crosses the road 40, the control system 1 may control the display of the pedestrian crossing 25 such that the wheelchair 82 can cross the road 40. The road 40 on which the vehicle 60 travels is also referred to as a roadway.

Hereinafter, a configuration example of the control system 1 will be described.

Control Device 10

The control device 10 controls various components of the control system 1. The control device 10 may be configured to include one or more processors. According to the embodiment, the "processor" is a general-purpose processor, a dedicated processor specialized for specific processing, or the like. However, the processor is not limited thereto. The control device 10 may be configured to include one or more dedicated circuits. The dedicated circuit may include, for example, a field-programmable gate array (FPGA) or an application-specific integrated circuit (ASIC). The control device 10 may be configured to include the dedicated circuit instead of the processor, or may be configured to include the dedicated circuit together with the processor.

The control device 10 may further include a storage unit. The storage unit is, for example, a semiconductor memory, a magnetic memory, or an optical memory. However, the storage unit is not limited to these memories. The storage unit may function as, for example, a main storage device, an auxiliary storage device, or a cache memory. The storage unit may include an electromagnetic storage medium such as a magnetic disk. The storage unit stores any information used for the operation of the control device 10. The storage unit may store, for example, a system program, an application program, or the like. The storage unit may be configured as a storage device separate from the control device 10.

The control device 10 may further include an interface for outputting information, data, or the like to another device, or for acquiring information, data, or the like from another device. The interface may include a communication module configured to be able to communicate with the pedestrian crossing display device 20 and the like via a network 30. The communication module may include a communication module corresponding to mobile communication standards such as the fourth generation (4G) or the fifth generation (5G). However, the communication module is not limited to this. The interface may be configured to be connectable to the communication module.

The control device 10 may include one server device or multiple server devices that can communicate with each other.

Road Surface Drive Device 50

Figure 3:
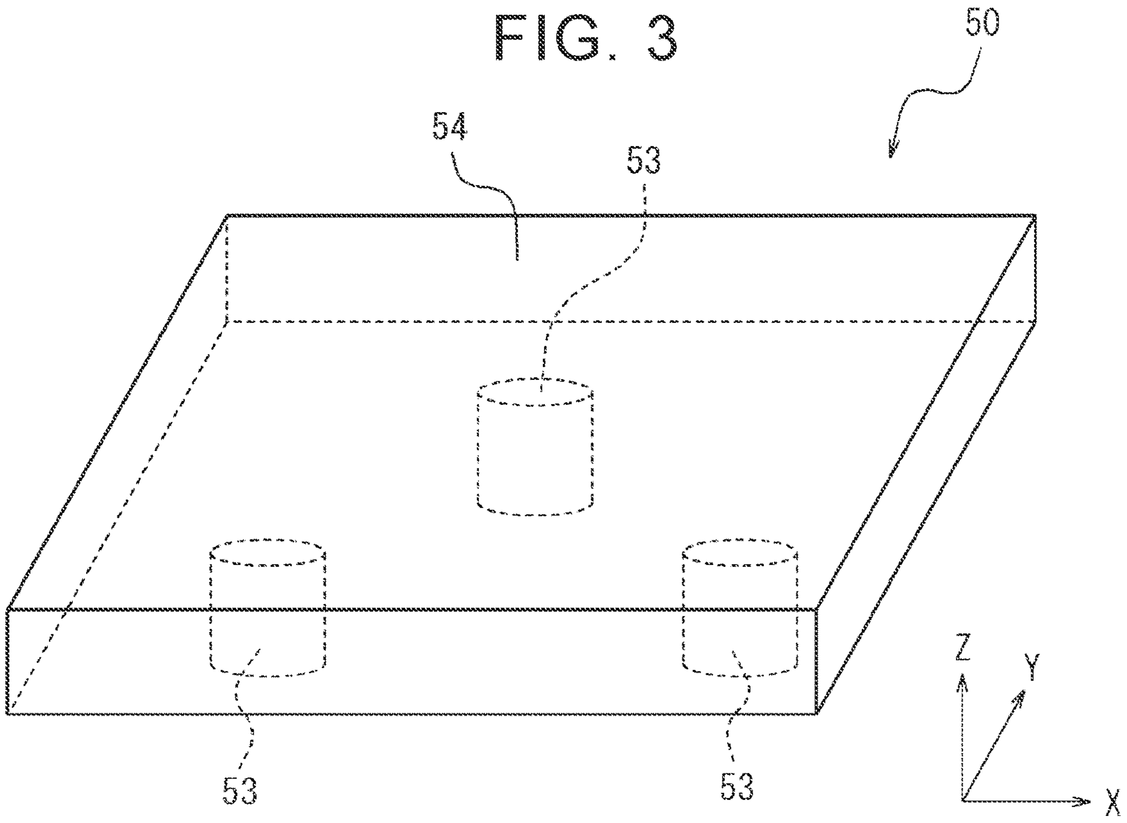
FIG. 3 is a diagram showing a configuration example of a road surface drive device.
Figure 4:
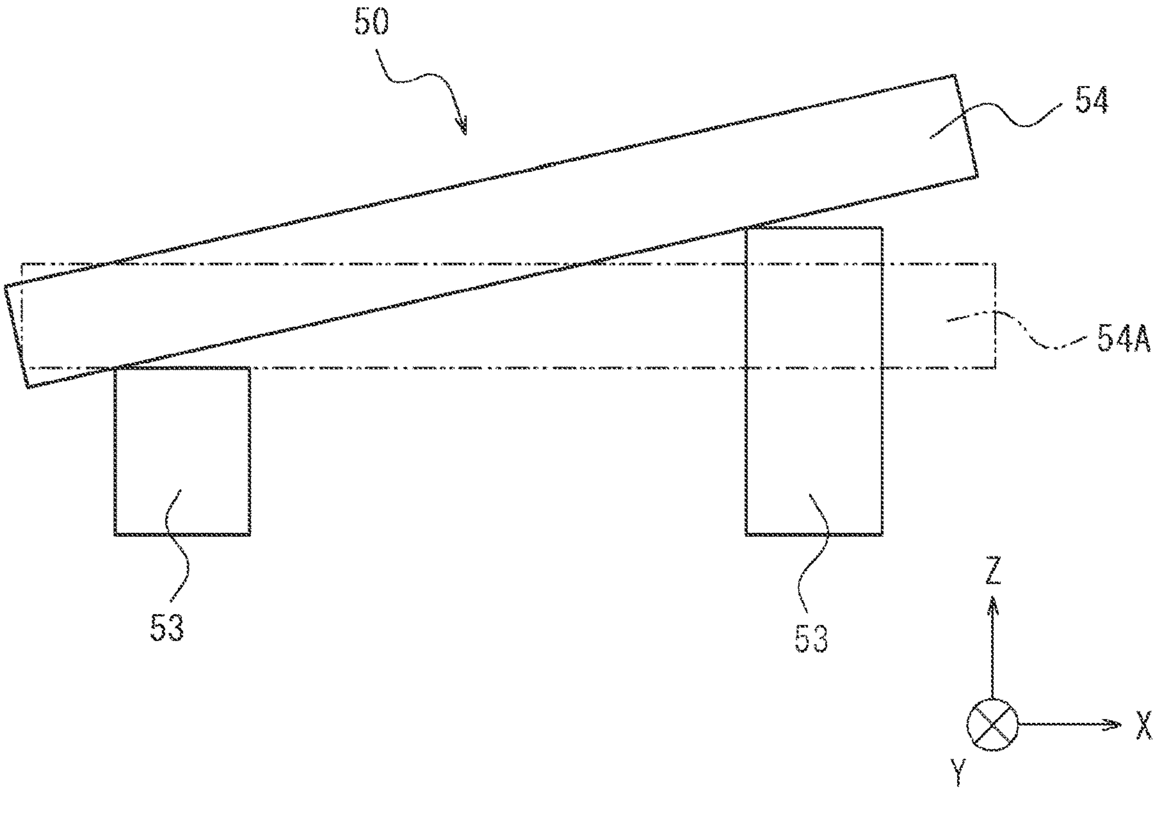
FIG. 4 is a side view showing a configuration example in which a road surface of a sidewalk is inclined.

As shown in FIGS. 1 and 3, the road surface drive device 50 includes a base 54 constituting the road surface, a drive unit 53 for driving the base 54, and a control unit 51 for controlling the drive unit 53. The base 54 is configured as a plate-shaped member extending along the XY plane. As shown in FIG. 4, the drive unit 53 can move the base 54 from a state in which the base 54 extends along the XY plane that is virtually shown as a base 54A to a state in which the base 54 is inclined with respect to the XY plane, by moving at least a part of the base 54 in the Z-axis direction. Further, the drive unit 53 can move the height of the base 54 while keeping the base 54 extending along the XY plane, by moving the entire base 54 in the Z-axis direction. As a result, the road surface drive device 50 can control the inclination or the height of the base 54. Further, since the base 54 constitutes the road surface, the road surface drive device 50 can control the inclination or the height of the road surface. The road surface drive device 50 may change the inclination of the road surface based on control information that indicates the direction and the magnitude of the inclination of the road surface from the control device 10.

Figure 5:
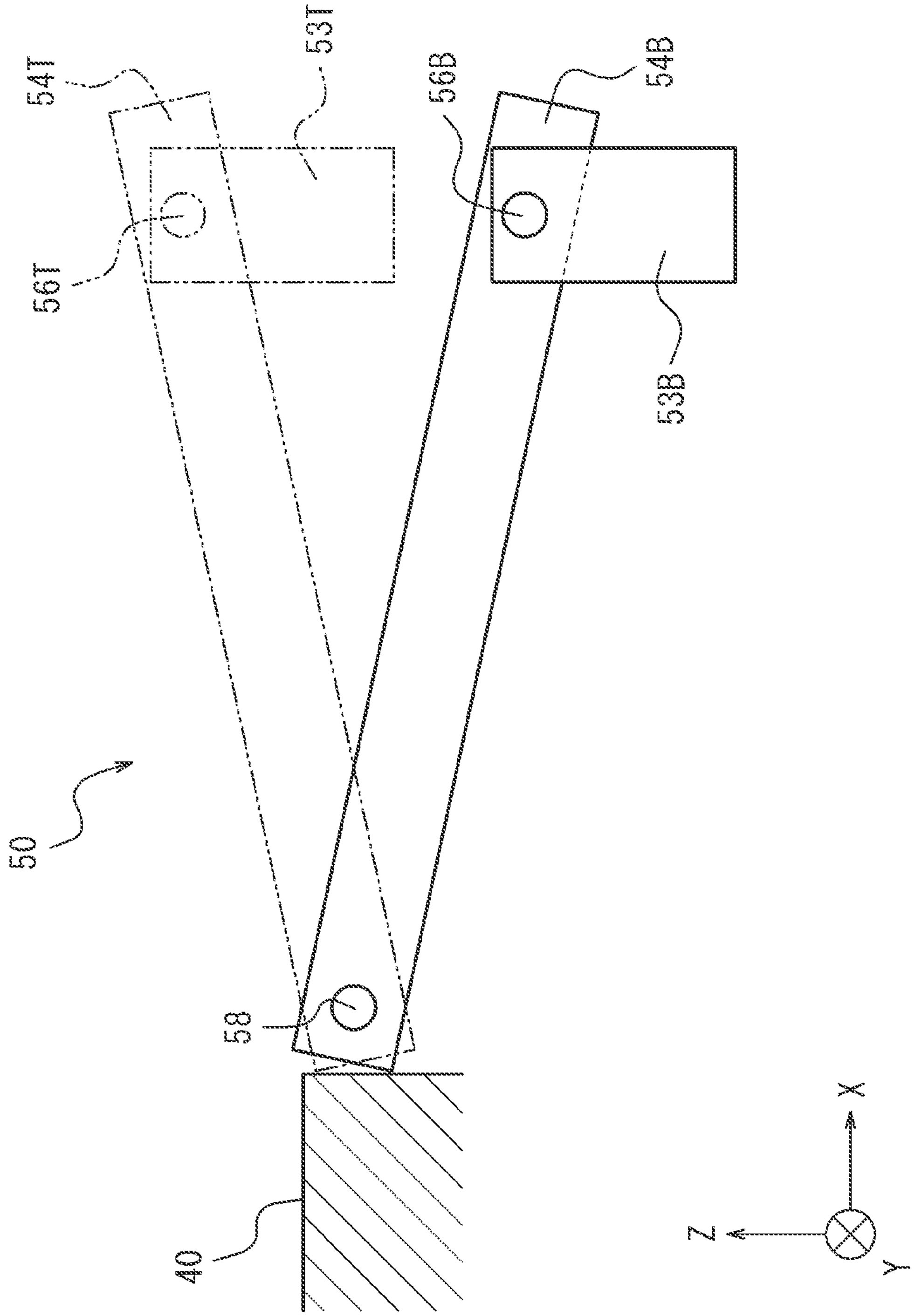
FIG. 5 is a side view showing a configuration example in which the road surface of the sidewalk connected to a road is inclined.

In the road surface drive device 50, as shown in FIG. 5, the base 54 can be controlled such that the positive side thereof in the X-axis direction is lowered as shown as a base 54B, or the positive side thereof in the X-axis direction is raised as shown as a base 54T. In FIG. 5, the base 54 is configured to be pivotable about a pivot portion 58 that is located on the negative side in the X-axis direction. Further, an end of the base 54 on the positive side in the X-axis direction is connected to the drive unit 53 at a predetermined position. The base 54 is pivotably connected to the drive unit 53 at a predetermined position. When the base 54 is in a state as shown as the base 54T, the drive unit 53 moves in the positive direction of the Z-axis as shown as a drive unit 53T, and pushes a connection position between the drive unit 53 and the base 54 up to the position shown as a connection portion 56T. When the base 54 is in a state as shown as the base 54B, the drive unit 53 moves in the negative direction of the Z-axis as shown as a drive unit 53B, and pushes the connection position between the drive unit 53 and the base 54 up to the position shown as a connection portion 56B. That is, the inclination of the base 54 is controlled as the drive unit 53 moves up and down along the Z-axis direction. When the base 54 is configured as the road surface of the sidewalk and the base 54 is in the state shown by the base 54T, the road surface of the sidewalk is inclined in a direction from the sidewalk toward the road 40. On the contrary, when the base 54 is in the state shown by the base 54B, the road surface of the sidewalk is inclined in a direction from the road 40 toward the sidewalk.

The control unit 51 may be configured to include one or more processors, or may be configured to include one or more dedicated circuits. The control unit 51 may further include a storage unit. The control unit 51 may further include an interface for outputting information, data, or the like to another device, or for acquiring information, data, or the like from another device.

The drive unit 53 may be configured to include, for example, a motor and the like. The drive unit 53 may be configured to include a linear actuator and the like. The drive unit 53 is not limited to these, and may be configured to include devices that realize various movements.

The road surface drive device 50 may further include a sensor for detecting the wheelchair 82 located on the base 54. The sensor for detecting the wheelchair 82 may be configured to include, for example, a weight sensor and the like, but is not limited to this, and may be configured to include various sensors. The control unit 51 may output the detection result of the wheelchair 82 by the sensor to the control device 10.

Pedestrian Crossing Display Device 20

The pedestrian crossing display device 20 includes a control unit 21 and a display unit 23.

The control unit 21 controls various components of the pedestrian crossing display device 20. The control unit 21 may be configured to include one or more processors. The control unit 21 may be configured to include one or more dedicated circuits. The dedicated circuit may include, for example, an FPGA or an ASIC. The control unit 21 may be configured to include the dedicated circuit instead of the processor, or may be configured to include the dedicated circuit together with the processor.

The pedestrian crossing display device 20 may further include a storage unit. The storage unit of the pedestrian crossing display device 20 may be configured to be the same as or similar to the storage unit of the control device 10. The storage unit is, for example, a semiconductor memory, a magnetic memory, or an optical memory. However, the storage unit is not limited to these memories. The storage unit may function as, for example, a main storage device, an auxiliary storage device, or a cache memory. The storage unit may include an electromagnetic storage medium such as a magnetic disk. The storage unit stores any information used for the operation of the pedestrian crossing display device 20. The storage unit may store, for example, a system program, an application program, or the like. The storage unit may be included in the control unit 21.

The pedestrian crossing display device 20 may further include an interface. The interface outputs information, data, or the like to the control device 10, or acquires information, data, or the like from the control device 10. The interface of the pedestrian crossing display device 20 may be configured to be the same as or similar to the interface of the control device 10. The interface may include a communication module configured to be able to communicate with the control device 10 and the like via the network 30. The communication module may include a communication module corresponding to mobile communication standards such as the 4G or the 5G. However, the communication module is not limited thereto. The interface may be configured to be connectable to the communication module.

The display unit 23 is configured to display the pedestrian crossing 25 on the road surface of the road 40. The display unit 23 may be configured to include light sources installed so as to be embedded in the road surface of the road 40, for example, as shown in FIG. 1. The light source may be configured to include a light emitting element such as a light emitting diode (LED) or a laser diode (LD). The light source may be configured to include, for example, a light bulb or a fluorescent lamp. The mode in which the light sources are installed in the road 40 is not limited to the example of FIG. 1.

The display unit 23 may be configured to further include a diffuser plate or the like that diffuses the light emitted from the light sources such that the driver of the vehicle 60 traveling on the road 40 or a user 80 who crosses the road 40 can easily see the light emitted from the light sources.

The number of pedestrian crossing display devices 20 included in the control system 1 is not limited to one, and may be two or more.

Configuration for Detecting Wheelchair 82

The control system 1 may control the road surface of the sidewalk or display the pedestrian crossing 25 on the road 40 when there is the wheelchair 82 that may cross the road 40. The control system 1 may detect the wheelchair 82 located within a predetermined distance from the road 40 and determine whether there is a possibility that the detected wheelchair 82 will cross the road 40.

The control system 1 further includes, although not essential, a detection device 70 as a configuration for detecting the wheelchair 82 located within a predetermined distance from the road 40. The detection device 70 may be configured to include a sensor capable of detecting the presence of the wheelchair 82, such as a camera or a motion sensor. The detection device 70 may be installed, for example, in the vicinity of the road 40. The detection device 70 may be configured to detect the traveling speed or the position of the wheelchair 82. The traveling speed or the position of the wheelchair 82 is also collectively referred to as a state of the wheelchair 82.

The detection device 70 may output the detection result of the wheelchair 82 to the control device 10 via the network 30. The detection device 70 may output the detection result of the wheelchair 82 to the control device 10 by, for example, short-range communication or the like, without the network 30. The detection result of the wheelchair 82 includes the detection result that the wheelchair 82 is located within a predetermined distance from the road 40. The detection result of the wheelchair 82 may further include the detection result of the state of the wheelchair 82. The control device 10 may determine whether there is the wheelchair 82 that may cross the road 40 based on the detection result of the wheelchair 82. The control device 10 may calculate the number of wheelchairs 82 that may cross the road 40.

The control system 1 further includes, although not essential, a terminal device 72 as a configuration for detecting the wheelchair 82 located within a predetermined distance from the road 40. The terminal device 72 may be carried by the user 80 of the wheelchair 82. The terminal device 72 may be mounted on the wheelchair 82. The terminal device 72 may include, for example, a receiver compatible with a satellite positioning system such that the position information of the wheelchair 82 can be detected. The receiver compatible with the satellite positioning system may include, for example, a global positioning system (GPS) receiver.

The terminal device 72 may output the position information of the wheelchair 82 to the control device 10 via the network 30. The terminal device 72 may output the position information of the wheelchair 82 to the control device 10 by, for example, short-range communication or the like, without the network 30. The control device 10 detects the wheelchair 82 located within a predetermined distance from the road 40 based on the position information of the wheelchair 82. The control device 10 determines whether there is a possibility that the detected wheelchair 82 will cross the road 40. The control device 10 may calculate the number of wheelchairs 82 that may cross the road 40.

When the wheelchair 82 in which the user 80 is sitting crosses the road 40, the terminal device 72 may accept an application for crossing the road 40 from the user 80. The terminal device 72 may output information that the wheelchair 82 applies for crossing the road 40. The control device 10 may detect the wheelchair 82 that crosses the road 40, by acquiring the information of the application for crossing the road 40 from the terminal device 72 or the wheelchair 82.

The detection device 70 or the terminal device 72 may detect the wheelchair 82 that may cross the road 40 and output the detection result to the control device 10. The detection device 70 or the terminal device 72 may calculate the number of wheelchairs 82 that may cross the road 40 and further output the calculation result to the control device 10.

The control device 10 may detect the wheelchair 82 waiting on the sidewalk based on the information acquired from the terminal device 72 mounted on the wheelchair 82 waiting on the sidewalk or the terminal device 72 carried by the user 80 sitting in the wheelchair 82 waiting on the sidewalk. The control device 10 may detect the wheelchair 82 waiting on the sidewalk based on the detection result of the wheelchair 82 by the sensor of the road surface drive device 50.

Operation Example of Control System 1

When the wheelchair 82 crosses the road 40, the wheelchair 82 may wait on the sidewalk around the road 40 until starting crossing. When the wheelchair 82 is waiting on the sidewalk, it may be difficult to make the wheelchair 82 stationary due to the inclination of the road surface of the sidewalk. Further, when the wheelchair 82 enters the road 40 from the sidewalk, it may be difficult for the wheelchair 82 to move toward the road 40 due to the inclination of the road surface of the sidewalk. The control system 1 can control the road surface of the sidewalk such that the wheelchair 82 can easily cross the road 40, for example, by operating as described below.

Detection of Wheelchair 82

The control device 10 detects the wheelchair 82 that crosses the road 40. The control device 10 may detect the wheelchair 82 located within a predetermined distance from the road 40 or the wheelchair 82 staying within the predetermined distance from the road 40 for a predetermined time or longer, as the wheelchair 82 that crosses the road 40. The control device 10 may detect the wheelchair 82 that crosses the road 40 based on, for example, the position information of the wheelchair 82 itself or the position information of the terminal device 72 mounted on the wheelchair 82 or the terminal device 72 carried by the user 80 of the wheelchair 82. The control device 10 may detect the wheelchair 82 that crosses the road 40 based on, for example, images of the road 40 and the surroundings of the road 40. The control device 10 may detect the wheelchair 82 that crosses the road 40 based on, for example, the detection result of the sensor for detecting the presence of the wheelchair 82 on and around the road 40. The control device 10 may detect the wheelchair 82 that crosses the road 40 by acquiring the information of the application for crossing the road 40 from the wheelchair 82.

As will be described later, the control device 10 controls the inclination of the road surface of the sidewalk at the position where the wheelchair 82 waits before crossing the road 40. The control device 10 may determine the position where the road surface drive device 50 is installed as the position where the wheelchair 82 waits before crossing the road 40. The control device 10 may notify the wheelchair 82 or the user 80 of the waiting position of the wheelchair 82. Further, the control device 10 may display the waiting position of the wheelchair 82 on the road surface of the sidewalk. By doing so, the convenience of the user 80 of the wheelchair 82 is improved.

Display of Pedestrian Crossing 25

The control device 10 controls the pedestrian crossing display device 20 such that the pedestrian crossing 25 is displayed on the road 40 on which the vehicle 60 travels. That is, the control device 10 controls the display of the pedestrian crossing 25 on the road 40 on which the vehicle 60 travels. Further, the control device 10 outputs information for displaying the pedestrian crossing 25 within a range determined based on the state of the wheelchair 82 that crosses the road 40. The control device 10 may generate control information of the pedestrian crossing display device 20 and output the control information to the pedestrian crossing display device 20 such that the pedestrian crossing display device 20 displays the pedestrian crossing 25. The pedestrian crossing display device 20 may display the pedestrian crossing 25 on the road 40 with the display unit 23 based on the control information.

Drive of Road Surface of Sidewalk

The control device 10 controls the road surface drive device 50 so as to reduce the inclination of the road surface of the sidewalk on which the wheelchair 82 that crosses the road 40 is located. The control device 10 outputs, as the control information, information of instruction to reduce the inclination of the road surface to the road surface drive device 50. The road surface drive device 50 moves the base 54 with the drive unit 53 such that the inclination of the road surface comes closer to flat.

When the pedestrian crossing 25 is displayed, the control device 10 may output, to the road surface drive device 50, instruction information of instruction to incline, toward the road 40, the road surface of the sidewalk on which the wheelchair 82 waits before crossing.

When the wheelchair 82 starts crossing the road 40, the control device 10 may output, to the road surface drive device 50, control information of instruction to incline, toward the road 40, the road surface of the sidewalk on which the wheelchair 82 waits before crossing. In this case, the road surface drive device 50 may incline the road surface of the sidewalk toward the road 40, as shown by the base 54T in FIG. 5. By doing so, the wheelchair 82 can easily start crossing the road 40. Consequently, the convenience of the wheelchair 82 is improved. The control device 10 may determine the timing at which the wheelchair 82 starts crossing the road 40 based on the information that can be acquired from the detection device 70, the terminal device 72, the wheelchair 82, or the like.

The control device 10 may output, to the road surface drive device 50, control information of instruction to restore the inclination of the road surface at the position where the wheelchair 82 was waiting to the original inclination, after the wheelchair 82 leaves the position where the wheelchair 82 was waiting before crossing. The control device 10 may determine that the wheelchair 82 has started crossing the road 40 and left the position where the wheelchair 82 was waiting before crossing, based on the information that can be acquired from the detection device 70, the terminal device 72, the wheelchair 82, or the like.

When the control device 10 changes the inclination of the road surface with the road surface drive device 50, the control device 10 may notify a person who is located within a predetermined range from the wheelchair 82 or a person who is located within a predetermined range from the road surface drive device 50, of the change in the inclination of the road surface. The predetermined range may be appropriately set as a range in which the inclination of the road surface affects the person, for example. The control unit 51 of the road surface drive device 50 may notify the surroundings, of the change in the inclination of the road surface. Further, the control device 10 may notify the terminal device 72 mounted on the wheelchair 82 or the terminal device 72 carried by the user 80, of the change in the inclination of the road surface. By notifying the change in the inclination of the road surface, the wheelchair 82 or the surrounding people can know the change in the inclination of the road surface. As a result, safety of the change in the inclination of the road surface can be enhanced.

Procedure Example of Control Method

Figure 6:
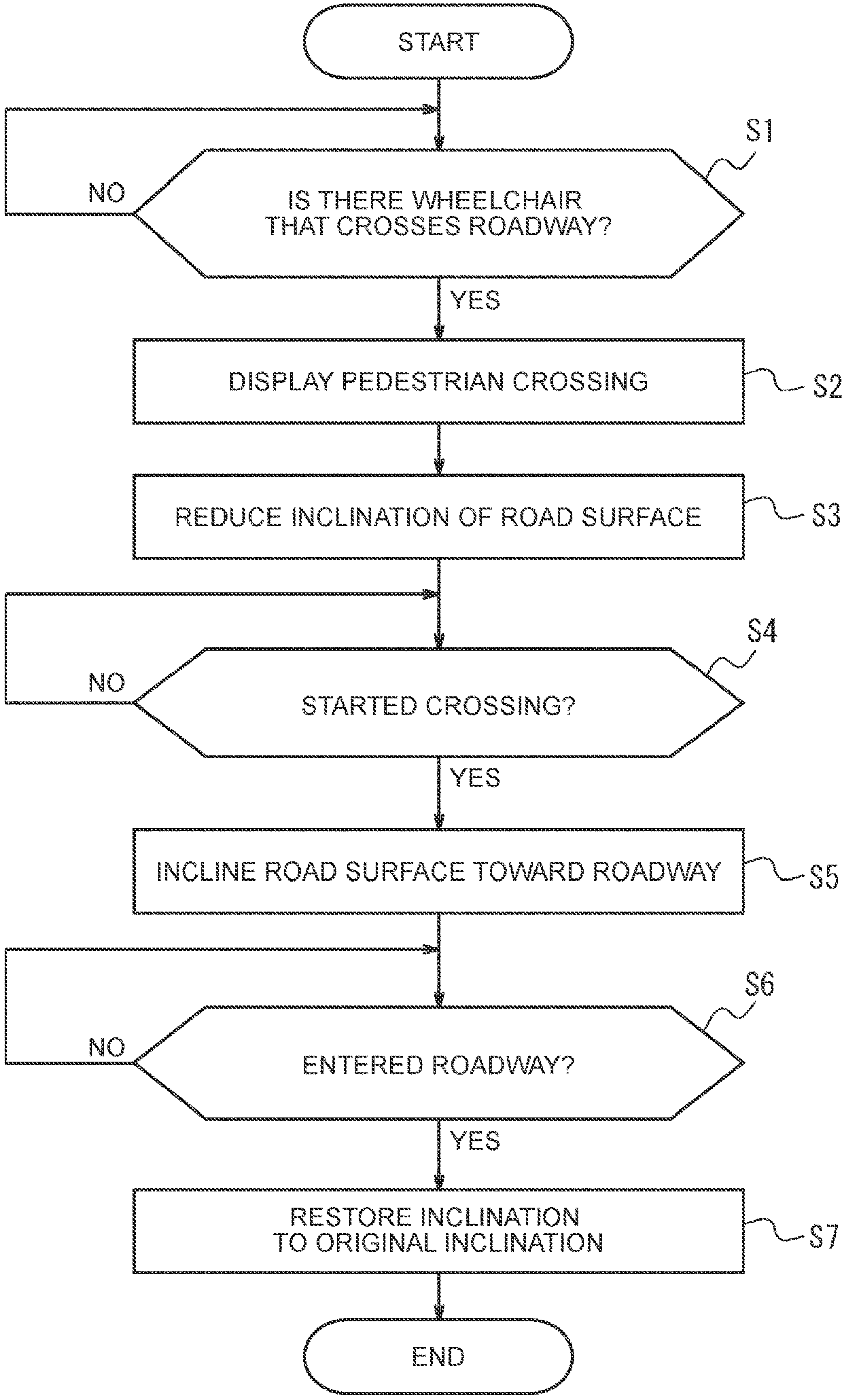
FIG. 6 is a flowchart showing a procedure example of a control method according to the embodiment.

The control device 10 may execute a control method including the procedure of a flowchart illustrated in FIG. 6. The control method may be realized as a control program to be executed by the processor constituting the control device 10.

The control device 10 determines whether there is the wheelchair 82 that may cross the road 40 (roadway) (step S1). Specifically, the control device 10 may detect the wheelchair 82 that may cross the road 40 based on the information acquired from the detection device 70 or the terminal device 72. When there is no wheelchair 82 that may cross the road 40 (step S1: NO), the control device 10 repeats the determination procedure of step S1.

When there is the wheelchair 82 that may cross the road 40 (step S1: YES), the control device 10 displays the pedestrian crossing 25 on the road 40 (step S2). Specifically, the control device 10 determines a range in which the pedestrian crossing 25 is displayed, and outputs control information for causing the pedestrian crossing display device 20 to display the pedestrian crossing 25.

The control device 10 reduces the inclination of the road surface at the position where the wheelchair 82 that crosses the road 40 is waiting (step S3). Specifically, the control device 10 generates information for controlling the inclination of the road surface and outputs the information to the road surface drive device 50.

The control device 10 determines whether the wheelchair 82 has started crossing the road 40 (step S4). When the wheelchair 82 has not started crossing the road 40 (step S4: NO), the control device 10 repeats the determination procedure of step S4. When the wheelchair 82 has started crossing the road 40 (step S4: YES), the control device 10 inclines the road surface toward the road 40 (roadway) (step S5).

The control device 10 determines whether the wheelchair 82 has entered the road 40 (roadway) (step S6). When the wheelchair 82 has not entered the road 40 (step S6: NO), the control device 10 repeats the determination procedure of step S6. When the wheelchair 82 has entered the road 40 (step S6: YES), the control device 10 restores the inclination of the road surface to the original inclination (step S7). Specifically, the control device 10 generates information for controlling the inclination of the road surface and outputs the information to the road surface drive device 50. After executing the procedure in step S7, the control device 10 ends the execution of the procedure of the flowchart shown in FIG. 6.

Summary

As described above, the control system 1 according to the present embodiment controls the inclination of the road surface at the position where the wheelchair 82 that crosses the road 40 waits before crossing. This facilitates the wheelchair 82 to wait or enter the road 40. As a result, the convenience of the wheelchair 82 that crosses the road 40 is enhanced.

Other Embodiments

The control system 1 is not limited to the above-described mode, and may be realized in various other modes. Hereinafter, other embodiments will be described.

Determination of Wheelchair 82

As described above, the control device 10 may determine that the user 80 of the wheelchair 82 may cross the road 40 when the wheelchair 82 is located within a predetermined distance from the road 40. The control device 10 may determine whether the user 80 of the wheelchair 82 has an intension to cross the road 40 as well as whether the wheelchair 82 may cross the road 40. Specifically, the control device 10 may determine whether the user 80 of the wheelchair 82 has an intention to cross the road 40 based on the movement of the wheelchair 82 or the user 80. When the control device 10 detects, as the movement of the wheelchair 82 or the user 80, a movement of staying or watching the vehicle 60 traveling on the road 40 for a predetermined time or longer at the side of the road 40, the control device 10 may determine that the user 80 of the wheelchair 82 has an intention to cross the road 40. By determining whether the user 80 of the wheelchair 82 has an intention to cross the road 40, unnecessary display of the pedestrian crossing 25 can be reduced. As a result, the influence on traveling of the vehicle 60 can be reduced.

Although the embodiments according to the present disclosure have been described above based on the drawings and examples, it should be noted that those skilled in the art can make various modifications and alterations thereto based on the present disclosure. It should be noted, therefore, that these modifications and alterations are within the scope of the present disclosure. For example, the functions included in each means, each step, or the like can be rearranged so as not to be logically inconsistent, and a plurality of means, steps, or the like can be combined into one or divided.

What is claimed is:

1. A control device that outputs control information to a sidewalk configured such that an inclination of a road surface is changeable, wherein when the control device detects a wheelchair waiting on the sidewalk for crossing a road, the control device outputs, as the control information, information of instruction to reduce the inclination of the road surface of the sidewalk.

2. The control device according to claim 1, wherein when the control device detects the wheelchair that crosses the road, a pedestrian crossing is displayed on the road.

3. The control device according to claim 2, wherein when the pedestrian crossing is displayed, the control device outputs, as the control information, information of instruction to incline the road surface of the sidewalk on which the wheelchair waits before crossing toward the road.

4. The control device according to claim 1, wherein when the wheelchair starts crossing the road, the control device outputs, as the control information, information of instruction to incline the road surface of the sidewalk on which the wheelchair waits before crossing toward the road.

5. The control device according to claim 3, wherein after the wheelchair leaves a position where the wheelchair was waiting before crossing, the control device outputs, as the control information, information of instruction to restore the inclination of the road surface at a waiting position to an original inclination.

6. The control device according to claim 1, wherein the control device detects, as the wheelchair that crosses the road, a wheelchair that stays on the sidewalk for a predetermined time or longer or a wheelchair that outputs information of application for crossing the road.

7. The control device according to claim 1, wherein the control device determines a position where the wheelchair waits before crossing and notifies the wheelchair of the position.

8. The control device according to claim 7, wherein the control device displays the position where the wheelchair waits before crossing.

9. The control device according to claim 1, wherein when the control device changes the inclination of the road surface, the control device notifies the wheelchair or a person who is located within a predetermined range from the road surface, of a change in the inclination of the road surface.

10. The control device according to claim 9, wherein the control device notifies a terminal device mounted on the wheelchair waiting on the sidewalk or carried by a user sitting in the wheelchair waiting on the sidewalk, of the change in the inclination of the road surface.

11. The control device according to claim 1, wherein the control device detects the wheelchair waiting on the sidewalk based on information acquired from a terminal device mounted on the wheelchair waiting on the sidewalk or carried by a user sitting in the wheelchair waiting on the sidewalk.

12. A control system comprising:

the control device according to claim 1; and a road surface drive device that changes the inclination of the road surface of the sidewalk.

13. A control method comprising outputting, as control information, information of instruction to reduce an inclination of a road surface of a sidewalk, to the sidewalk configured such that the inclination of the road surface is changeable, when a wheelchair waiting on the sidewalk for crossing the road is detected.

14. The control method according to claim 13, further comprising displaying a pedestrian crossing on the road, when the wheelchair that crosses the road is detected.

15. The control method according to claim 14, further comprising outputting, as the control information, information of instruction to incline the road surface of the sidewalk on which the wheelchair waits before crossing, toward the road, when the pedestrian crossing is displayed.

16. The control method according to claim 13, further comprising outputting, as the control information, information of instruction to incline the road surface of the sidewalk on which the wheelchair waits before crossing toward the road, when the wheelchair starts crossing the road.

17. The control method according to claim 15, further comprising outputting, as the control information, information of instruction to restore the inclination of the road surface at a waiting position to an original inclination, after the wheelchair leaves a position where the wheelchair was waiting before crossing.

18. A road surface drive device that controls an inclination of a road surface, the road surface drive device comprising:

a base that constitutes the road surface;

a drive unit that drives the base; and a control unit that controls the drive unit so as to change the inclination of the road surface based on control information that indicates a direction and a magnitude of the inclination of the road surface.

19. The road surface drive device according to claim 18, wherein the control unit notifies surroundings of a change in the inclination of the road surface.

20. The road surface drive device according to claim 18, wherein the control unit outputs a detection result of a wheelchair waiting on the road surface.

* * * * *